United States Patent
Blase

[19]

[11] Patent Number: 5,980,409
[45] Date of Patent: Nov. 9, 1999

[54] ENERGY TRANSMISSION CHAIN

[75] Inventor: Günter Blase, Bergisch Gladbach, Germany

[73] Assignee: Igus Spritzgussteile fur Die Industrie GmbH, Koeln, Germany

[21] Appl. No.: 08/860,188

[22] PCT Filed: Oct. 28, 1996

[86] PCT No.: PCT/DE96/02067

§ 371 Date: Jul. 10, 1997

§ 102(e) Date: Jul. 10, 1997

[87] PCT Pub. No.: WO97/17557

PCT Pub. Date: May 15, 1997

[30] Foreign Application Priority Data

Nov. 10, 1995 [DE] Germany .......................... 195 41 928

[51] Int. Cl.$^6$ ............... F16G 15/10; F16G 13/02
[52] U.S. Cl. ........................... 474/218; 474/226
[58] Field of Search ................ 474/202, 206, 474/218, 219, 223, 224, 226, 227, 228, 230, 232, 233, 234

[56] References Cited

U.S. PATENT DOCUMENTS

| | | | |
|---|---|---|---|
| 745,975 | 12/1903 | Sweany | 474/218 |
| 2,450,592 | 10/1948 | Howison | 474/218 |
| 2,988,926 | 6/1961 | Mazzarins | 474/218 |
| 3,054,300 | 9/1962 | Bowman | 474/218 |
| 3,503,579 | 3/1970 | Kurlandsky | 248/51 |
| 4,043,215 | 8/1977 | Long et al. | 474/218 |
| 4,181,035 | 1/1980 | Shockley | 474/218 |
| 4,704,098 | 11/1987 | Tsubakimoto | 474/226 |
| 4,983,147 | 1/1991 | Wu | 474/226 |
| 5,741,196 | 4/1998 | Campagnolo | 474/226 |

FOREIGN PATENT DOCUMENTS

| | | |
|---|---|---|
| 2415374 | 10/1975 | Germany . |
| 3431531 | 3/1986 | Germany . |
| 3516448 | 9/1986 | Germany . |
| 4325259 | 7/1995 | Germany . |
| 33312 | 8/1972 | Japan . |
| 1477749 | 9/1987 | Japan . |

Primary Examiner—Charles A Marmor
Assistant Examiner—Matthew A. Kaness
Attorney, Agent, or Firm—Browdy and Neimark

[57] ABSTRACT

The invention relates to an energy transmission chain for guiding hoses, cables and the like between two connection points. The chain links each have two side elements connected by cross-members. The side elements of adjacent chain links have overlapping sections and are joined to rotate around a pivot in one plane. Energy transmission chains with high lateral stability, which do not sag, particularly when installed in a lateral position, and which are simple and inexpensive to manufacture are frequently desired. This is the case if the moveable consumer connected to the energy transmission chain is traversed in a horizontal plane. Thus, in the energy transmission chains disclosed, at least one of the respective adjacent side elements (1) has at least one guide groove (7) extending parallel to the plane of rotation. The side element adjacent to this element engages one of the guide grooves over the entire angle of rotation by means of a guide element (8) extending parallel to the plane of rotation.

12 Claims, 7 Drawing Sheets

ENERGY TRANSMISSION CHAIN

BACKGROUND OF THE INVENTION

1. Technical Field of the Invention

The invention relates to an energy transmission chain for guiding hoses, cables and the like between two connection points, where the chain links each have two side elements connected by cross-members, and the side elements of adjacent chain links display overlapping sections and are joined via these in a pivoting and swivelling fashion in one plane.

2. Prior Art

Energy transmission chains of this kind are mainly used for guiding flexible supply lines from a fixed starting point to a moveable consumer. In this context, the energy transmission chains, following the movement of the consumer, are traversed in a vertical plane. Particularly in self-supporting applications of the energy transmission chain with sagging arc-shaped sections, i.e. where the upper strand of the energy transmission chain is arranged freely above the lower strand and thus sags, high moments of force which act on the joints of the chain links occur in the event of tensile or compressive stresses on the self-supporting part of the energy transmission chain. If the energy transmission chain used in such a manner displays only insufficient lateral stability, this can result in the overlapping sections swivelling out of the swivelling plane, meaning that a uniform load is no longer placed on the hinge pins by the adjacent side elements. Instead, zones of high mechanical stress arise at the hinge pins which may ultimately result in the fracture of the hinge pins. Similar wear phenomena are also observed in the ascending section of the deflection arcs of energy transmission chains if the upper strand is guided on the lower strand in a sliding manner.

In another field of application, the moveable consumers are moved in a horizontal plane, meaning that the energy transmission chains also have to be traversed in this horizontal plane. Insufficient lateral stability of the energy transmission chains again proves to be disadvantageous in this context. As the energy transmission chains are usually arranged in a freely suspended manner, supporting the energy transmission chains on the underside by means of appropriately modified guide channels involves extremely complicated constructions or is simply impossible. Energy transmission chains which are freely arranged in a lateral position thus often sag. This necessitates increased expenditure of energy when the energy transmission chain is traversed and, owing to the chain sagging, results in the joints of the chain links being exposed to great mechanical stress perpendicular to the travel path, this in turn causes zones of high stress which entail increased wear. This drastically reduces the service life of the chain links.

OBJECT AND SUMMARY OF THE INVENTION

It is thus the task of the present invention to create an energy transmission chain which displays high lateral stability, does not sag, particularly when installed in a lateral position, and is simple and inexpensive to manufacture.

According to the invention, this task is solved in that at least one of the respective adjacent side elements displays at least one guide groove extending parallel to the swivelling plane and the side element adjacent to this one engages one of the guide grooves over the entire swivelling angle by means of at least one guide element extending parallel to the swivelling plane. This considerably increases the lateral stability of the energy transmission chain and prevents both the chain links tilting out of the swivelling plane relative to each other and lateral displacement of the chain links. Sagging is effectively prevented, particularly in freely suspended energy transmission chains in a lateral position.

In this context, the guide groove can be of comparatively short length, provided that it is ensured that one guide element of the adjacent side element always engages the guide groove. The guide groove, or the flanks of the same, can also be perforated, meaning that the guide groove is ultimately defined solely by one or more projections arranged at intervals from each other. If the element of the adjacent side element engaging the guide groove is designed with little clearance to both flanks of the guide groove, the side elements are prevented from tilting out of the swivelling plane in either direction and the energy transmission chain can be used in both of its lateral positions.

In particular, the outer edge of the overlapping section of the side element can serve as the guide element in this context.

Importantly, the present invention is independent of the remaining design of the cross-members. The cross-members can be integrally moulded on the side elements in one piece or connected to them by means of the familiar snap-in or hinge fastenings. The cross-members can also extend over a relatively great length of the side elements, resulting in essentially closed chain links. In particular, the cross-members can also be of divided design in the longitudinal direction, meaning that the design of the chain links according to the invention increases the stability of the same further still.

It is advantageous for the guide element to be designed as a projection extending parallel to the swivelling plane and arranged on the face end of the side element in the direction of the adjacent chain link. In this context, the term face end signifies the area of a side element which faces the adjacent side element. The projection is thus set at the maximum distance from the pivoting joint of the adjacent side elements, resulting in particularly high lateral stability.

As the projection is thinner than the side element in the area adjacent to the projection and it is arranged at a distance from the outer surface of the side element, the side elements can be produced with a smaller width. In this context, it has been found that such projection dimensions are perfectly adequate for achieving satisfactory lateral stability of the energy transmission chain. In particular, the lateral extension of the area of the side element bordering the guide groove on the outer side in such a configuration can also be limited in such a way that it does not project beyond the height of the adjacent area of the neighbouring side element. This creates a compact design of the energy transmission chain, while simultaneously avoiding laterally projecting sections which could result in the chain links of the energy transmission chain becoming interlocked.

It is advantageous for the guide groove and the guide element of adjacent side elements to be designed as circular arcs which essentially extend over the entire height of the overlapping section of the side elements. This ensures that the guide element engaging the guide groove has maximum contact with the flank of the guide groove in the event of bending or similar, creating an energy transmission chain with particularly high lateral stability, which is especially suitable for accommodating heavy hoses, cables or similar.

To permit simple separation of the side elements fastened together, a recess, into which a tool can be inserted which acts on both overlapping sections, can be provided on at least one of the overlapping sections of adjacent side elements, adjoining the overlapping section of the other side element. The side elements can thus be levered apart in a particularly simple manner.

The guide groove, and the guide element of adjacent side elements engaging with it, can be provided with stop faces to limit the swivelling angle of both side elements. These stop faces can be provided on projections arranged in the guide groove or protruding from the guide elements parallel to the swivelling plane, which engage the corresponding recesses. The stops are thus at the maximum distance from the joints, creating particularly favourable leverage conditions and preventing the side elements being weakened by blind holes running perpendicular to their main plane.

In a preferred configuration, the side elements are connected by one-piece, integrally moulded hinge pins and corresponding recesses, where the height of the hinge pins and the depth to which the guide element extends into the corresponding guide groove are of such proportions that the hinge pins create a snap-in connection together with the guide groove and the guide element. The chain links can thus be fastened together in snap-in fashion while being guided at an angle. In particular, the height of the hinge pins and the depth of the guide element which engages the guide groove can be of such proportions that the side elements can be snap-fitted together by applying slight pressure or a light blow. This permits the side elements to still be fastened together and separated easily, although the tight snap-in connection simultaneously ensures high lateral stability of the energy transmission chain. In particular, such side elements can be manufactured in one piece, thus minimizing both the assembly effort and the manufacturing costs. Arranging the hinge pin, stop and guide element on the same outer overlapping section of the side element ensures particularly simple handling of the side elements when fastening them together.

In order to further facilitate assembly by means of the side elements sliding on top of one another and easier interlocking, and also to permit the chain links to be connected with as little clearance as possible, the hinge pin and/or the guide element and/or the corresponding guide groove can have bevelled outer edges.

The configuration is particularly advantageous if the bevelled edges of the guide element and/or the corresponding guide groove are provided with indentations. When fastening the side elements together, partial sections of one side element can be guided by the indentations arranged on the adjacent side element, thus further facilitating the fastening of the side elements to each other.

If the side elements are offset, and a hinge pin and a stop limiting the swivelling angle are integrally moulded on the outwardly offset section of the side element in one piece and the inwardly offset section has corresponding recesses, the guide element is located at the free end of the outwardly offset section and the guide groove at the opposite end of this section in a preferred configuration. This makes handling of the side elements particularly simple when joining them together and particularly stable strands of side elements can be formed. The strands of side elements of the energy transmission chains are constructed of side elements of identical design in this context.

Furthermore, the energy transmission chains can have strands of side elements made of alternating outer straps and inner straps, where the overlapping sections of the outer straps are provided with one-piece, integrally moulded hinge pins and stops limiting the swivelling angle and the overlapping sections of the inner straps are provided with corresponding recesses, the inner straps also displaying middle sections projecting towards the outside of the chain. In an advantageous advanced configuration, the guide element is located at each of the free ends of the overlapping sections of the outer strap and the guide groove is arranged on the sides of the middle section of the inner section facing the adjacent side elements. In such a configuration of the side elements, the side elements of the two strips of the energy transmission chain, which are arranged in opposing pairs, can be manufactured of side elements of identical design which are rotated through 180° relative to each other. This permits the opposing pairs of side elements of adjacent strips, which can be manufactured by the injection moulding process, for example, to be manufactured by means of identical moulds, meaning that particularly close tolerances are maintained and energy transmission chains with especially high and uniform lateral stability can be manufactured.

Furthermore, the energy transmission chains can have strands of side elements made of alternating outer straps and inner straps, where the overlapping sections of the outer straps and inner straps can be connected by means of separable hinge pins and the inner straps display middle sections which project towards the outside of the chain, and the outer straps display middle sections which project towards the inside of the chain. A particularly advantageous advanced configuration consists of arranging the guide element on each of the free ends of the overlapping sections of the outer strap and the inner strap, and arranging the guide groove on each of the sides of the middle section of the inner straps and outer straps facing the adjacent side elements. The side elements thus engage like a cog and each half of the side element is guided by an adjacent side element on both the outside and the inside. Moreover, side elements which are arranged opposite each other in adjacent strands of side elements can be of identical design, resulting in energy transmission chains with particularly high lateral stability.

BRIEF DESCRIPTION OF THE DRAWING

An example of the invention is illustrated in the drawings and described in more detail below on the basis of the drawings. The drawings show the following.

DETAILED DESCRIPTION OF THE PREFERRED EMBODIMENT(S) OF THE INVENTION

FIGS. 1A, 1B 2 and 3 show the side elements of the energy transmission chain according to the invention in a first embodiment. Side elements 1 are offset, the inner side of the outwardly offset sections 2A which overlap with adjacent chain links being provided with a one-piece, integrally moulded hinge pin 3 and a stop 4 limiting the swivelling angle of adjacent side elements. The inwardly offset section 2B of the side element stands back and displays a recess 5 into which a hinge pin 3 of the adjacent side element can be inserted, as well as a recess 6 which corresponds to a stop 4 of the adjacent side element. In accordance with the invention, side element 1 is provided with a guide groove 7 which is located on the overlapping section 2A, opposite to the free end of the same, and whose base runs in a plane parallel to the swivelling plane of side element 1. Projection 8 is located on the face-end of the free end of the overlapping section 2A, this projection engaging guide groove 7 of the adjacent side element when the links are assembled, limiting any tilting or displacement of adjacent side elements relative to each other in a direction perpendicular to the swivelling plane and resulting in an energy transmission chain of high lateral stability. Guide groove 7 and projection 8 which engages guide groove 7 of the adjacent side element are designed as circular arcs in this context, the segments extending over the entire height of side element 1, so that projection 8 is guided in guide groove 7 over the largest possible area over the entire swivelling range. This means that the energy transmission chain is also designed for high lateral loads. Projection 8 only extends over half the thickness of the overlapping section 2A, lying flush with the inner side of the latter, so that outer flank 9 of guide groove 7 which encompasses projection 8 does not protrude outwardly beyond the contiguous section of the adjacent side element. This is thus a particularly compact configuration which simultaneously prevents the chain links interlocking with other components.

Figure 1A:
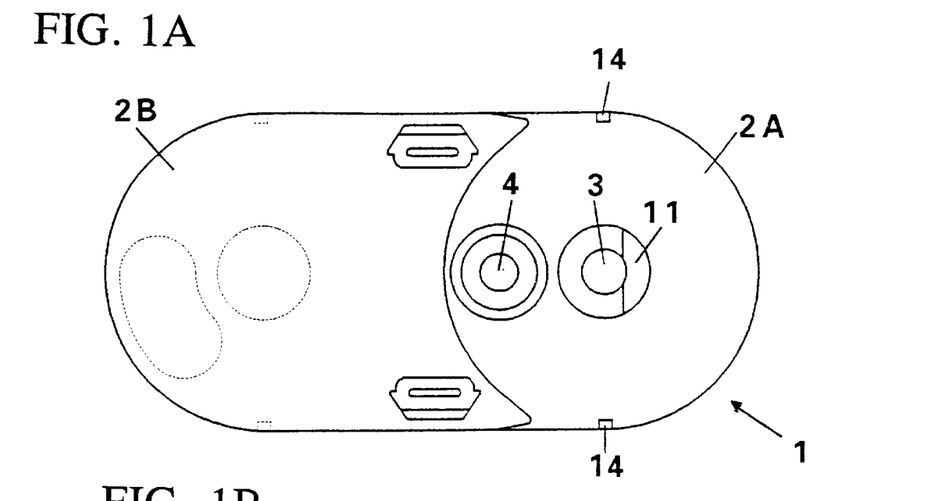
FIG. 1A A view of a side element in accordance with the invention in a first embodiment from the side facing towards the inside of the chain.
Figure 1B:
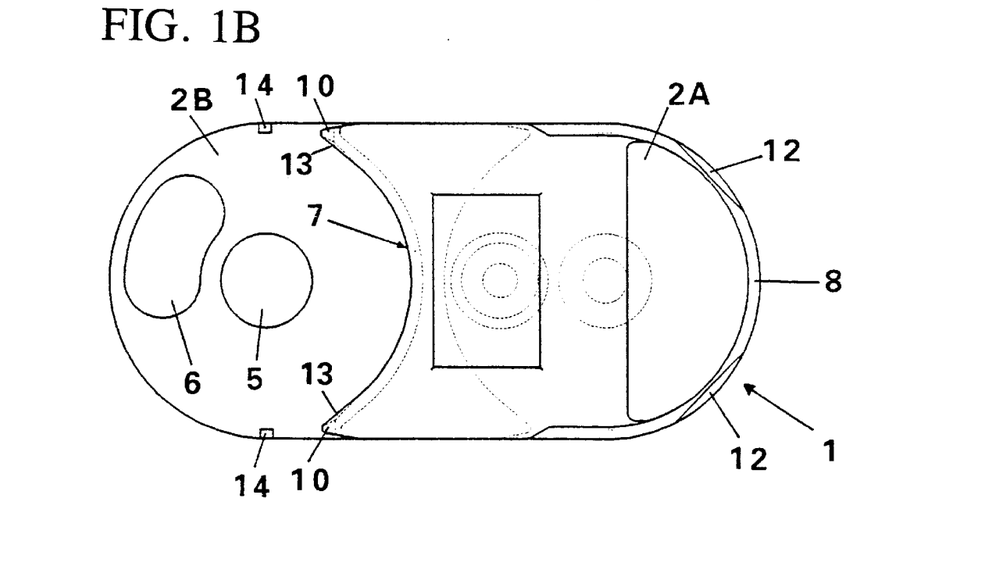
FIG. 1B A view of the side element of FIG. 1A from the siding facing way from the inside of the chain.
Figure 2:
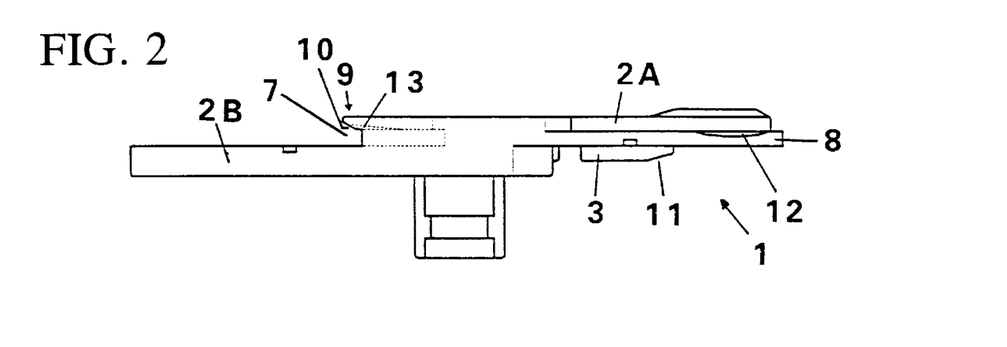
FIG. 2 A top view of a side element as per FIG. 1A, 1B.

Outer flank 9 of guide groove 7 is provided with a bevel 10 on the inner outside edge to facilitate assembly of the side elements. Furthermore, hinge pin 3 is also provided with a leading bevel 11 which lies in the longitudinal direction of side element 1. To assemble adjacent side elements, projecting section 2A of the first side element is overlapped with standingback section 2B of the second side element at an angle, so that projection 8 on the first side element engages guide groove 7 of the second side element and leading bevel 11 of hinge pin 3 of the first side element essentially lies flat on standing-back section 2B of the second side element. In this context, the dimensions of the height of hinge pin 3 and stop 4, the slant and areas of bevels 10 and 11, and the extension of projection 8 in a plane parallel to the swivelling plane are all coordinated so as to still permit snap-in connection of the side elements by exerting slight pressure or dealing a light blow to the side element in the direction of insertion. The snap-in connection thus has as little clearance as possible and displays maximum stability.

In this context, assembly is also additionally facilitated by indentations 12 and 13, which are arranged on projection 8 and on bevel 10 of flank 9 in such a way that the indentations of corresponding projections 8 and guide grooves 7 are arranged at the same height and are guided past each other when fastening the side elements. The indentations are designed as bevels which have a smaller slant than the outer edges of projection 8 and flank 9 of the guide groove. The indentations can also extend over the entire length of projection 8 or flank 9 of the guide groove or can be of convex design.

Figure 3:
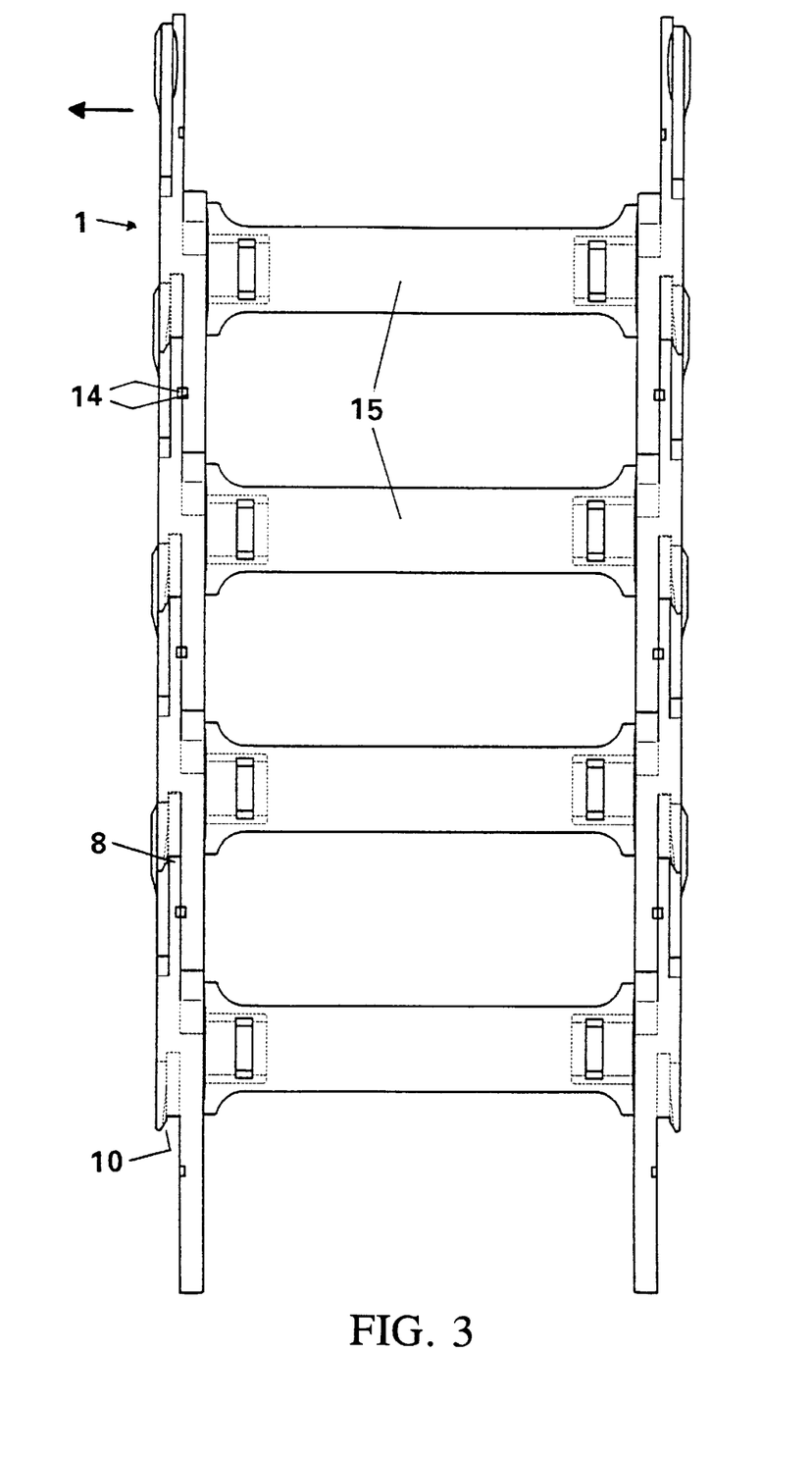
FIG. 3 A top view of an energy transmission chain as per FIGS. 1 and 2.

Furthermore, recesses 14 are arranged on the overlapping sections 2A and 2B of the side elements, these recesses ending at the inner and outer surfaces of sections 2A and 2B and lying flush with a recess of the opposite overlapping section of the adjacent side element when the side elements are assembled (FIG. 3). A tool which engages the opposite sections 2A and 2B of adjacent side elements can be inserted into these recesses 14, facilitating disassembly of the side elements. For example, the side elements can be separated by levering them apart using a screwdriver or similar.

FIG. 3 shows a top view of an energy transmission chain consisting of strips of side elements of identical design, where the side elements of opposite strips are designed as mirror images of each other. Opposite side elements are connected by means of integrally moulded snap-in webs via cross-members 15. This figure again shows that tilting or displacement of adjacent side elements out of the swivelling plane in a direction perpendicular to the latter (arrow) is prevented by projections 8 of the respective adjacent side element which engage guide grooves 7.

Figure 4A:
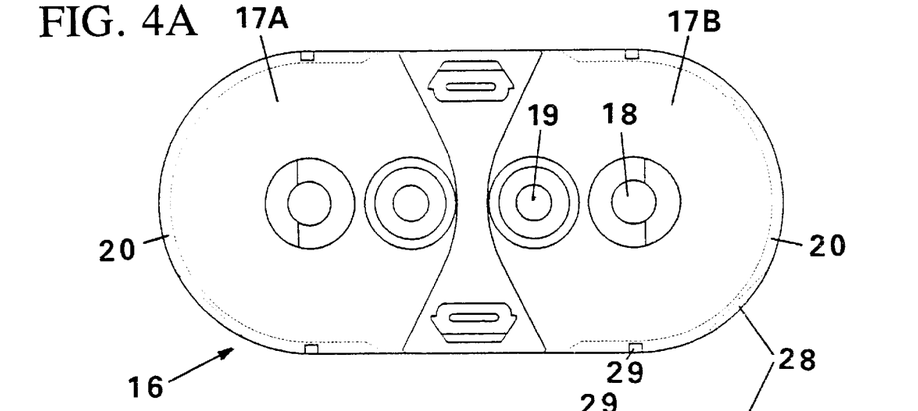
FIGS. 4A and 4B A side view and a top view of a side element designed as an outer strap in a second embodiment of the energy transmission chain.
Figure 4B:
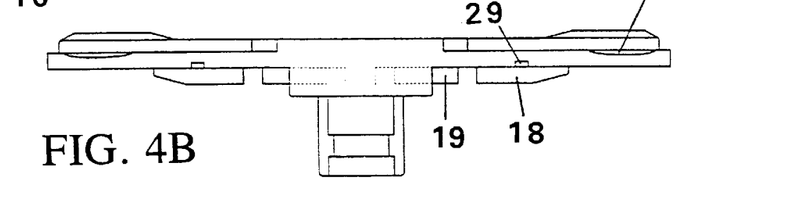
Figure 5A:
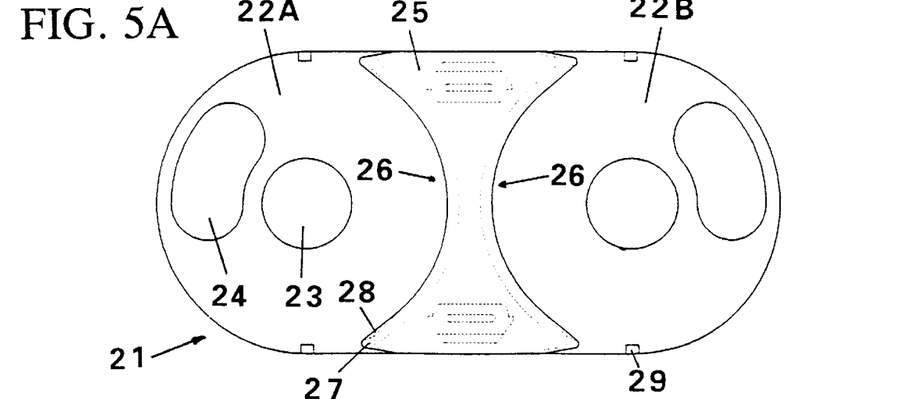
FIGS. 5A and 5B A side view and a top view of a side element designed as an inner strap of the second embodiment.
Figure 5B:
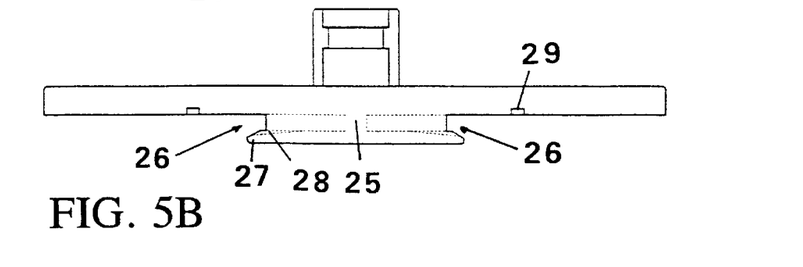
Figure 6:
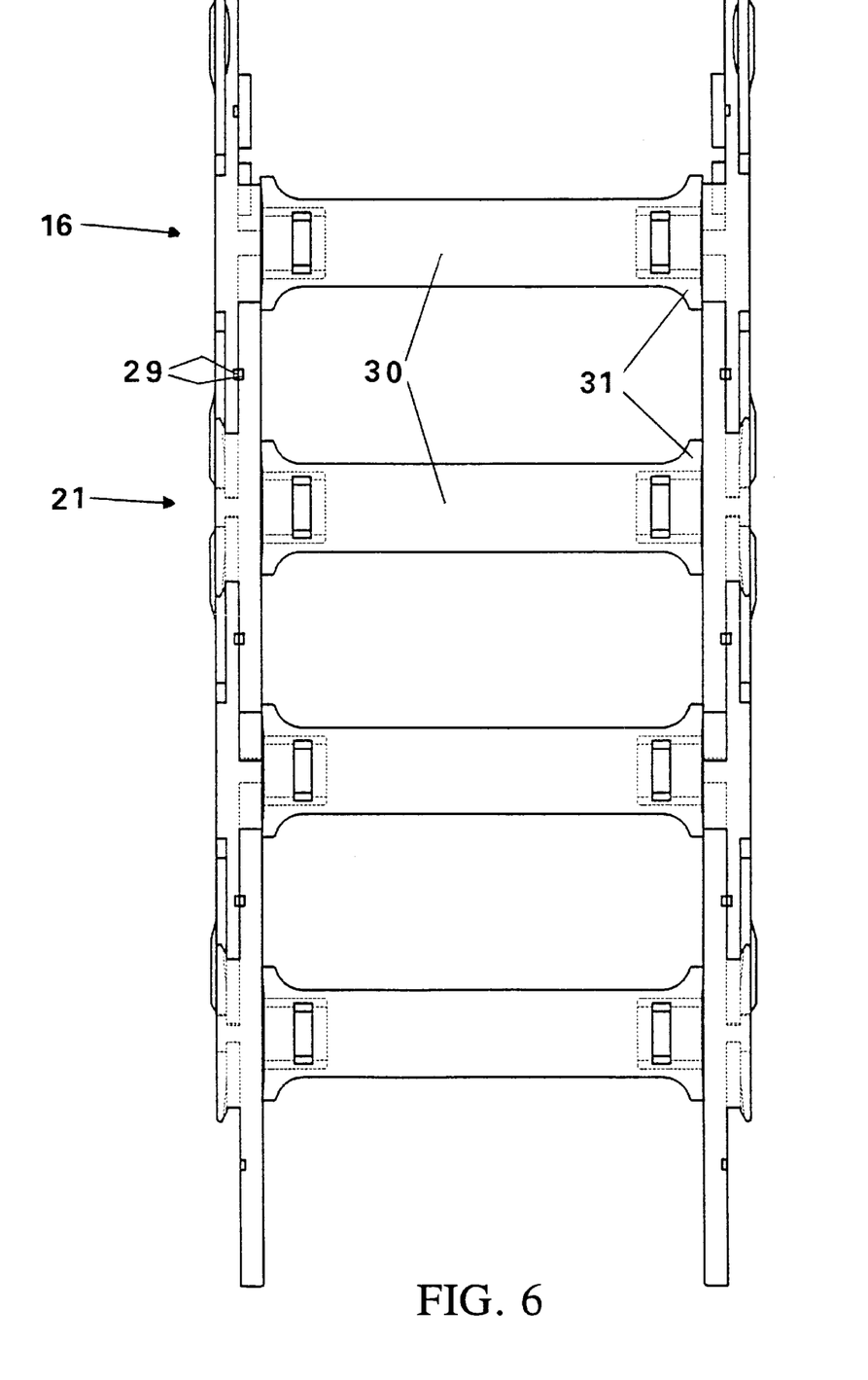
FIG. 6 A top view of an energy transmission chain as per FIGS. 4A, 4B and 5A and 5B.
Figure 7A:
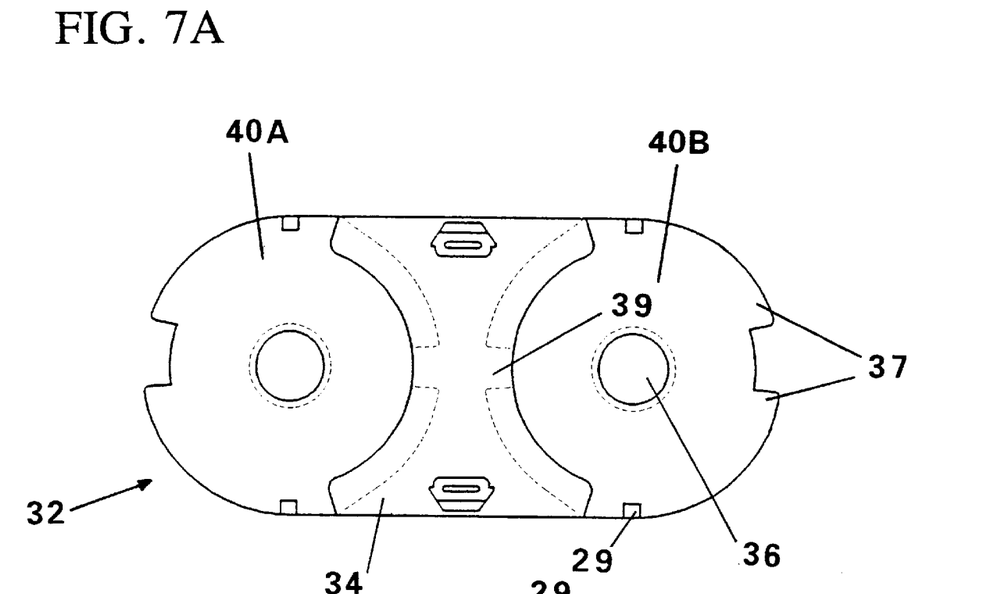
FIGS. 7A–7C A view of a side element in accordance with the invention designed as an outer strap in a third embodiment, from the side facing towards the inside of the chain (FIG. 7A) and the side facing away from it (FIG. 7C), as well as a top view (FIG. 7B)
Figure 7B:
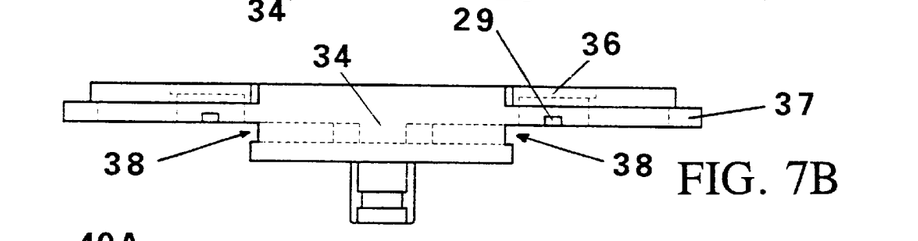
Figure 7C:
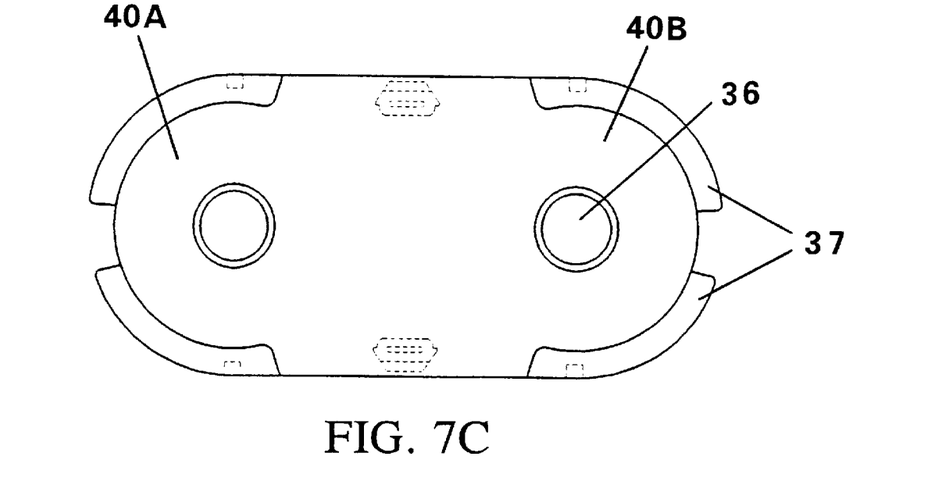
Figure 8A:
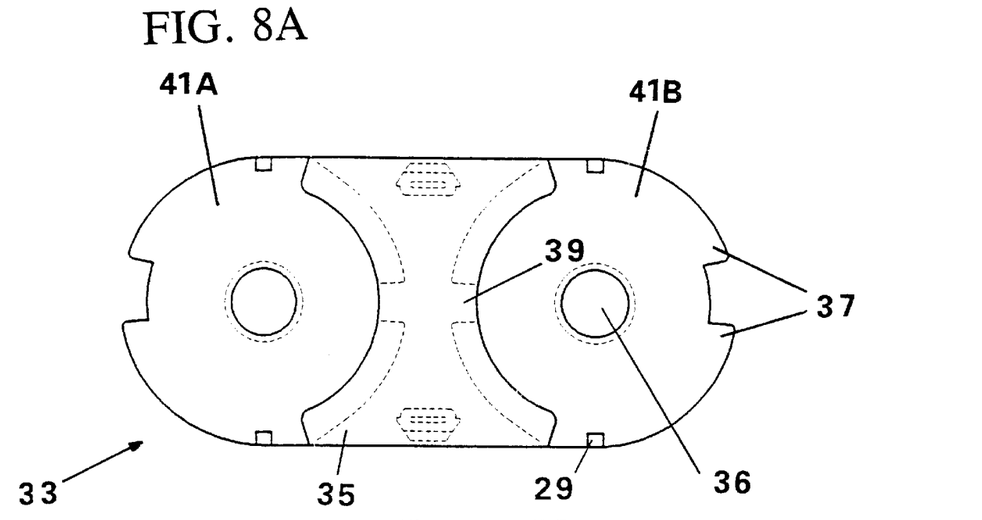
FIG. 8A–8C A view of a side element in accordance with the invention designed as an inner strap in a third embodiment, from the side facing towards the inside of the chain (FIG. 8A) and the side facing away from it (FIG. 8C), as well as a top view (FIG. 8B)
Figure 8B:
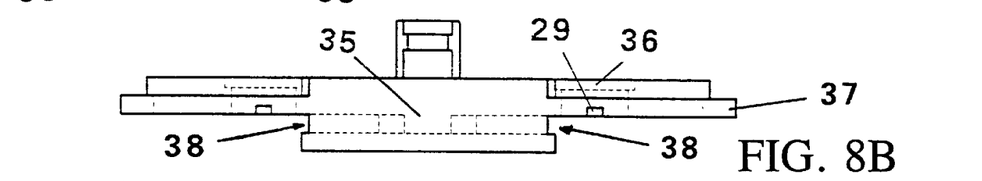
Figure 8C:
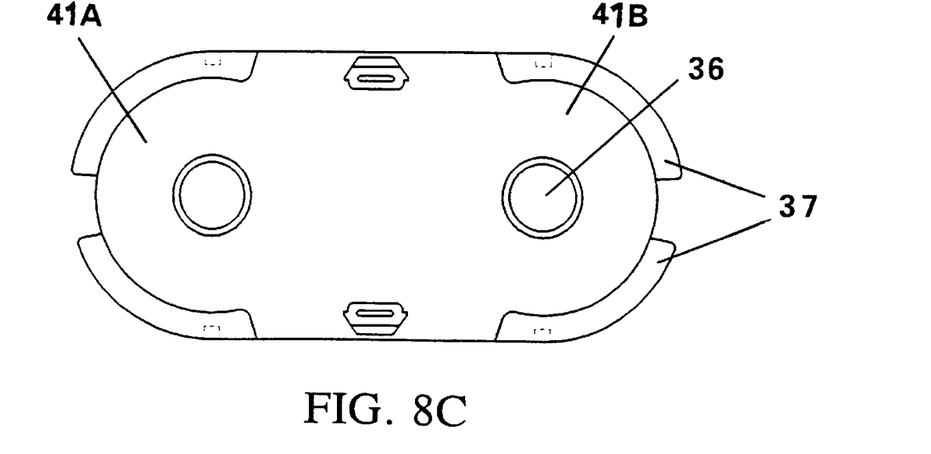

FIGS. 4 to 6 illustrate another embodiment where the lateral strips of the energy transmission chain, which are assembled from side elements, consist of two different types of side element—outer and inner straps—these being arranged alternately. Outer straps 16 display two overlapping sections 17A and 17B, which are arranged in an outwardly projecting manner and are each provided with a one-piece, integrally moulded hinge pin 18 and stop 19. Furthermore, projections 20, which protrude into the swivelling plane and extend over the entire height of outer straps 16, are arranged on the face end of overlapping sections 17A and 17B.

Inner straps 21, adjacent to outer straps 16, display overlapping sections 22A and 22B which face the inside of the energy transmission chain and are provided with recesses 23 and 24 corresponding to hinge pins 18 and stops 19 of the adjacent outer straps. Inner straps 21 are provided with guide grooves 26, into which projections 20 of outer straps 16 can be inserted as per the assembly of side elements 1 shown in FIGS. 1A to 3, in their middle sections 25, which face the free ends of overlapping sections 22A and 22B. Outer flank 27 of guide groove 26 and projections 20 are designed like those of side elements 1 and, in particular, are provided with indentations 28 to facilitate assembly.

As shown in FIG. 6, the side elements in turn display recesses 29 which are contiguous with the overlapping sections of the respective adjacent side element and facilitate the disassembly of adjacent side elements.

The outer and inner straps are connected by crossmembers 30 which can be fastened to snap-in webs facing the inside of the energy transmission chain. In this context, cross-members 30 are provided with wider areas 31 at their ends so that cross-members 30, which are fastened to outer straps 16, overlap with the adjacent inner straps 21. Guide grooves are thus formed by the combined effect of crossmembers 30 and the overlapping sections of outer straps 16, additionally increasing the lateral stability of the energy transmission chain.

FIGS. 7A to 9 show another embodiment in which the energy transmission chain displays alternately arranged outer straps 32 and inner straps 33. Outer straps 32 are provided with a projecting middle section 34 which faces the inside of the chain link, while inner straps 33 are provided with a projecting middle section 35 which faces outwards. These middle sections are both arranged between the sections which overlap with adjacent side elements. The overlapping sections of adjacent side elements display through bores 36, aligned with each other in the swivelling axis, into which the hinge pin (not shown) can be inserted and fastened in separable manner. In this embodiment, every overlapping section of a side element which is fastened to the adjacent side elements in pivoting fashion is provided with a projection 37, which functions as a guide element, and every longitudinal side of the middle sections 34 and 35 is provided with guide groove 38 corresponding to the projection of the adjacent side element. Every side element is thus guided by an adjacent guide element both on the outside and the inside, resulting in an energy transmission chain with particularly high 20 lateral stability.

In the practical example shown, guide groove 38 and projection 37 are both arranged contiguously to the centre plane of the side element, which lies in the swivelling plane, where the lateral extension of guide groove 38 and projection 37 corresponds to half the thickness of middle sections 34 and 35. Both projection 37 and the outer flank of guide groove 38 are thus designed with the same thickness.

In this embodiment, the side elements are fitted together by means of parallel displacement in the swivelling plane, so that the corresponding projections and guide grooves of adjacent side elements engage one another. Once the side elements are in their target position, they can be connected by inserting hinge pins into and through bores 36.

Furthermore, side elements 32 and 33 are provided with stops 39 which are arranged in guide grooves 38 and display lateral stop faces. This divides guide groove 38 into two partial sections, in each of which a projection 37 of the adjacent side element engages. Projections 37 of the side element are separated from one another by a notch in this context. The notch extends over a greater area than stop 39, thus defining the swivelling range of the side elements. Alternatively, the guide groove can also be provided with an indentation in which a projection of smaller dimensions on the adjacent side element engages.

It goes without saying that the first two embodiments mentioned can also be provided with a corresponding arrangement of stops and notches on the overlapping sections to limit the swivelling range. In this context, it is unnecessary to arrange stops 39 completely in the guide groove.

Figure 9:
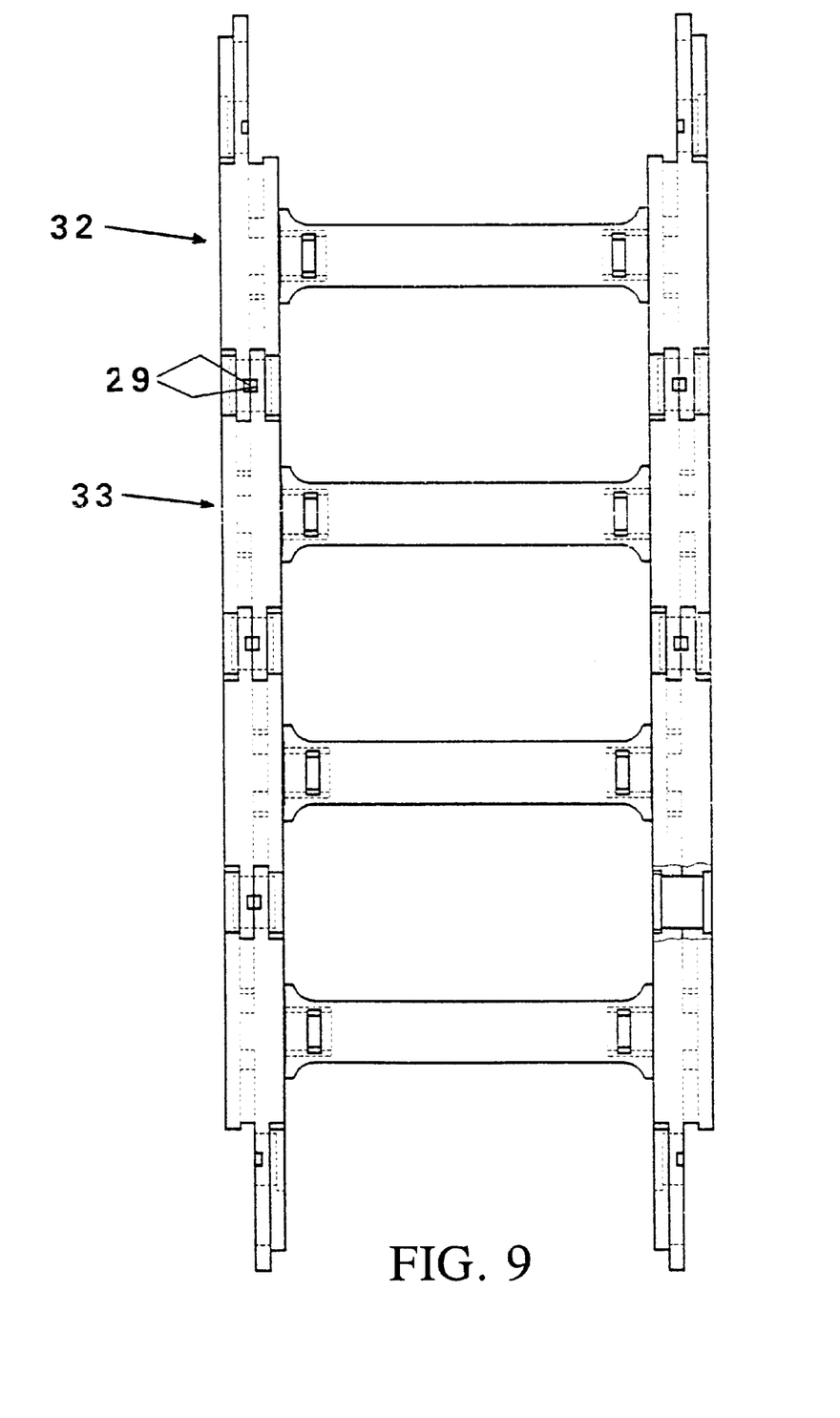
FIG. 9 A top view of an energy transmission chain as per FIGS. 7A–7C and 8A–8C.

FIG. 9 shows a top view of the energy transmission chain, illustrating the cog-like manner in which adjacent side elements engage. Recesses 29 are also provided in this embodiment to facilitate disassembly of the energy transmission chain.

LIST OF REFERENCE NUMBERS

1 Side element
2A Overlapping section
2B Overlapping section
3 Hinge pin
4 Stop
5 Recess
6 Recess
7 Guide groove
8 Projection
9 Outer flank
10 Bevel
11 Bevel
12 Indentation
13 Indentation
14 Recess
15 Cross-member
16 Outer strap
17A Overlapping section
17B Overlapping section
18 Hinge pin
19 Stop
20 Projection
21 Inner strap
22A Overlapping section
22B Overlapping section
23 Recess
24 Recess
25 Middle section
26 Guide groove
27 Outer flank
28 Indentation
29 Recess
30 Cross-member
31 Wider area
32 Outer strap
33 Inner strap
34 Middle section
35 Middle section
36 Through bore
37 Projection
38 Guide groove
39 Stop

What is claimed:

1. Energy transmission chain for guiding hoses and cable between two connection position, comprising a plurality of chain links, each link of said chain links having two side elements, each of said two side elements having an outer and inner side wall, each side wall being connected by at least one cross-member;

wherein side elements of adjacent chain links along a length of the chain have overlapping sections pivotally engaged and rotatable in an arc in one plane;

wherein, at least one of the side elements (1, 21, 33) of said adjacent chain links having at least one guide groove (7, 26, 38) extending parallel to the plane of rotation, and located between the outer and inner side wall;

another of the side elements of said adjacent chain links having at least one guide element extending parallel in the plane of rotation over an entire distance of the arc of rotation; and said guide element being rotatably engaged in said guide groove.

2. Energy transmission chain according to claim 1, wherein the guide element is a projection (8, 20, 37) extending from an edge of the side elements (1, 16, 32) in a direction toward an adjacent chain link of said adjacent chain links.

3. Energy transmission chain according to claim 2 wherein the projection (8, 20, 37) is thinner than the side element (1, 16, 32) adjacent to the projection and is spaced away from said outer and inner side wall.

4. Energy transmission chain according to claim 1, wherein the guide groove (7, 26, 38) and the guide element of said adjacent chain links are formed as circular arcs which extend over an entire height of the overlapping sections of the side elements of said adjacent chain link.

5. Energy transmission chain according to claim 1, wherein a recess (29) of said overlapping sections is provided on at least one of the overlapping sections of adjacent chain links which permits a tool to be inserted to engage the overlapping sections, so that the side elements can be separated.

6. Energy transmission chain according claim 1, wherein the guide groove (7, 26, 38) engaged to the guide element of the adjacent chain links has stop faces to limit a rotation angle of said side elements of the adjacent chain links.

7. Energy transmission chain according claim 1 where the overlapping sections of the side elements of adjacent chain links are connected by means of one-piece, integrally moulded hinge pins and corresponding recesses, wherein the height of the hinge pins (3, 18) and a depth to which the guide element extends into the corresponding guide groove (7, 26) being of such proportion that the hinge pins (3, 18) form a snap-in connection together with the guide groove (7, 26) and the guide element.

8. Energy transmission chain according to claim 7, wherein the hinge pin and the guide element and the corresponding guide groove have bevelled edges arranged opposite the adjacent chain links, permitting the side elements of adjacent chain links to slide on top of one another for purposes of simplifying snap-in connection.

9. Energy transmission chain according to claim 8, wherein the bevelled edges of the guide element and the corresponding guide groove are provided with indentations (12, 13, 28).

10. Energy transmission chain according to claim 1, wherein each overlapping section of said overlapping sections is offset from a longitudinal axis of the side elements of adjacent chain links, a hinge pin and a stop being integrally moulded in one piece on an outwardly facing offset section of said overlapping sections, and an inwardly facing offset section having corresponding recesses, wherein the guide element is arranged on one end of the outwardly offset section (2A) and a guide groove (7) is arranged on the opposite end.

11. Energy transmission chain according to claim 1, wherein said side element of adjacent chain links are made of alternating outer straps and inner straps, said outer straps having one-piece, integrally moulded hinge pins and stops on overlapping sections engaged in corresponding recesses on overlapping sections of the inner straps to limit rotation of the overlapping sections, the inner straps also having middle sections which project towards an outside of the chain, wherein guide elements are arranged at ends of overlapping sections (17A, 17B) of the outer strap (16) and guide grooves (26) are arranged on sides of the middle section (25) of the inner strap (21) facing the outer straps (16).

12. Energy transmission chain according to claim 1, wherein said side element of adjacent chain links are made of alternating outer straps and inner straps, where the overlapping sections of the outer straps and inner straps can be connected by detachable hinge pins and the inner straps have middle sections which project towards the outside of the chain and the outer straps display middle sections which project towards the inside of the chain, wherein the guide element is located on ends of the overlapping sections of the outer strap (32) and the inner strap (33) and the guide groove (38) is arranged on the middle sections (34, 35) of the outer straps (32) and inner straps (33) facing the adjacent side elements.

* * * * *